United States Patent
Huang (10) Patent No.: US 9,604,396 B2
(45) Date of Patent: Mar. 28, 2017

(54) MOLD CLAMPING DEVICE FOR AN AUTOMATIC MOLD OPENING AND CLOSING MACHINE

(71) Applicant: TIEN KANG CO., LTD., Taichung (TW)

(72) Inventor: David Huang, Taichung (TW)

(73) Assignee: Tien Kang Co., Ltd., Taichung (TW)

( * ) Notice: Subject to any disclaimer, the term of this patent is extended or adjusted under 35 U.S.C. 154(b) by 123 days.

(21) Appl. No.: 14/802,324

(22) Filed: Jul. 17, 2015

(65) Prior Publication Data

US 2017/0015038 A1    Jan. 19, 2017

(51) Int. Cl.
  *B29C 33/30*  (2006.01)
  *B29C 45/67*  (2006.01)
  *B29C 45/03*  (2006.01)
  *B29C 45/17*  (2006.01)

(52) U.S. Cl.
  CPC .............. *B29C 45/67* (2013.01); *B29C 45/03* (2013.01); *B29C 33/305* (2013.01); *B29C 45/1742* (2013.01)

(58) Field of Classification Search
  CPC .... B29C 33/305; B29C 45/1742; B29C 45/84
  See application file for complete search history.

(56) References Cited

U.S. PATENT DOCUMENTS

| | | | | |
|---|---|---|---|---|
| 2,984,176 A | * | 5/1961 | Sommer | B21D 37/04 100/295 |
| 5,096,405 A | * | 3/1992 | Pace | B29C 45/1742 425/192 R |
| 5,785,908 A | * | 7/1998 | Bott | B29C 45/1742 264/219 |
| 8,900,494 B2 | * | 12/2014 | Notter | B29C 33/30 264/328.1 |

* cited by examiner

*Primary Examiner* — James Mackey
(74) *Attorney, Agent, or Firm* — Wang Law Firm, Inc.

(57) ABSTRACT

A mold clamping device for an automatic mold opening and closing machine is used to clamp or release an upper mold which has a pair of wings. The mold clamping device is provided with two pressure cylinder units located at two lateral surfaces of the mold mounting unit, two pivot units pivoted to the two pressure cylinder units, respectively, and two clamping members pivotally disposed between the pressure cylinder units and the pivot units. When the first piston is in the first position, the clamping member will be rotated an angle to disengage the inner portion from the wing of the upper mold, and when in the second position, the piston will drive the clamping member to rotate an angle in a reverse direction, so that the wing of the upper mold is clamped between the inner portion and the bottom surface of the mold mounting unit.

6 Claims, 7 Drawing Sheets

MOLD CLAMPING DEVICE FOR AN AUTOMATIC MOLD OPENING AND CLOSING MACHINE

BACKGROUND OF THE INVENTION

Field of the Invention

The present invention relates to an automatic mold opening and closing machine, and more particularly to a mold clamping device for an automatic mold opening and closing machine.

Description of the Prior Art

A mold assembly can generally be divided into an upper mold and a lower mold by the joint surface. A part of the mold cavity is formed in the upper mold, another part is formed in the lower mold, and when the upper and lower molds are closed, the mold cavity will be filled with material which will be molded into a finally product after cooling off. When the mold assembly is applied in a vertical injection molding machine for automatic molding, it requires an automatic mold opening and closing device to perform opening and closing of the mold assembly in an automatic manner.

The automatic mold opening and closing device includes a base for mounting of a lower mold, a pivot seat pivotally disposed between a first position and a second position on the base, and a mold mounting unit disposed on the pivot seat to clamp or release an upper mold. When the pivot seat is in the first position, the mold mounting unit will be lowered down to clamp the mold or to move the mold downward, when the pivot seat is in the second position, the mold mounting unit and the mold will rotate an angle to finish the action of opening the mold.

The present invention is aimed at providing a mold clamping device which can carry out of the action of mold clamping or release easily and smooth.

SUMMARY OF THE INVENTION

The primary objective of the present invention is to provide a mold clamping device for an automatic mold opening and closing machine, which is capable of clamping and releasing the upper mold.

A mold clamping device for an automatic mold opening and closing machine is applied to a mold mounting unit and used to clamp or release an upper mold which has a pair of wings. The mold clamping device is provided with two pressure cylinder units, two pivot units and two clamping members. The two pressure cylinder units are located at two lateral surfaces of the mold mounting unit and each include a cylinder fixed to the lateral surfaces, two protrusions formed on the cylinder, and a piston inserted in the cylinder and movable between a first position and a second position. Each of the pistons includes a rod portion exposed out of the cylinder. The two pivot units are pivoted to the two pressure cylinder units, respectively, and each include two swing members, and each of the swing members being provided with a first pivot portion pivoted to a corresponding one of the protrusions, and a second pivot portion. The two clamping members are pivotally disposed between the pressure cylinder units and the pivot units, and each includes an outer portion pivoted to the rod portion of a corresponding one of the pistons, an inner portion for clamping or releasing the wings of the upper mold, and a middle portion located between the inner and outer portions and pivoted to the second pivot portion of a corresponding one of the swing members. The clamping member will be driven to rotate an angle to disengage the inner portion from the wing of the upper mold, when the first piston is in the first position, and when in the second position, the piston will drive the clamping member to rotate an angle in a reverse direction, so that the wing of the upper mold is clamped between the inner portion and the bottom surface of the mold mounting unit.

Preferably, each of the pistons extends and retracts along a direction from the top surface to the bottom surface of the mold mounting unit.

Preferably, the first pivot portion of the respective pivot units is pivoted to a corresponding one of the protrusions of the pressure cylinder units by a first pivot, and each of the first pivots has a first shaft portion inserted out of the first pivot portion and secured by a first restricting member.

Preferably, the outer portion of the respective clamping members is pivoted to the protrusions of the respective pressure cylinder units by a second pivot which has a second shaft portion inserted out of the outer portion and secured by a second restricting member.

Preferably, the middle portion of the respective clamping members is pivoted to the second pivot portion of the respective pivot units by a third pivot which has a third shaft portion inserted out of the second pivot portion and secured by a third restricting member.

Preferably, when the piston is in the first position, the inner portion of each of the clamping members is not within an area below the bottom surface of the mold mounting unit, and when the piston is in the second position, the inner portion of each of the clamping members is within the area below the bottom surface of the mold mounting unit.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
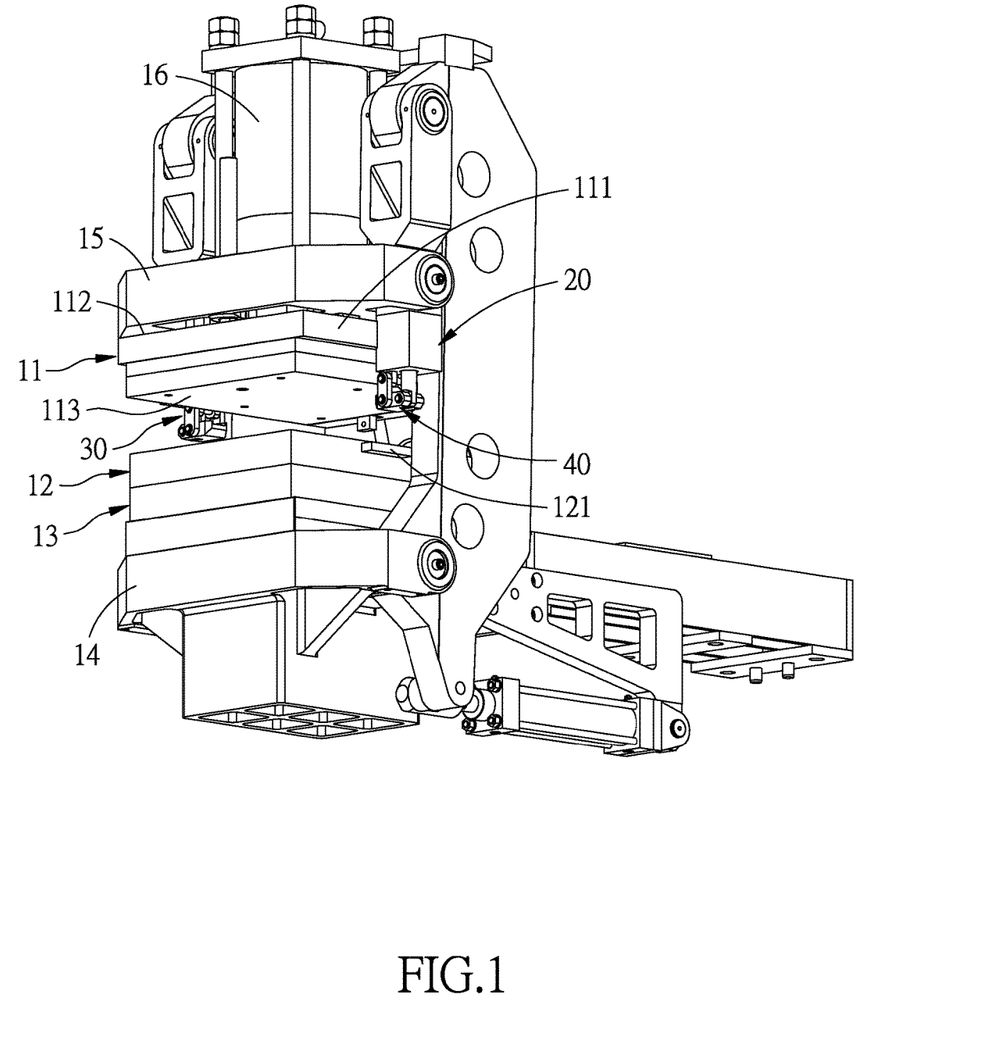
FIG. 1 is a perspective view of with a preferred embodiment of the present invention.
Figure 2:
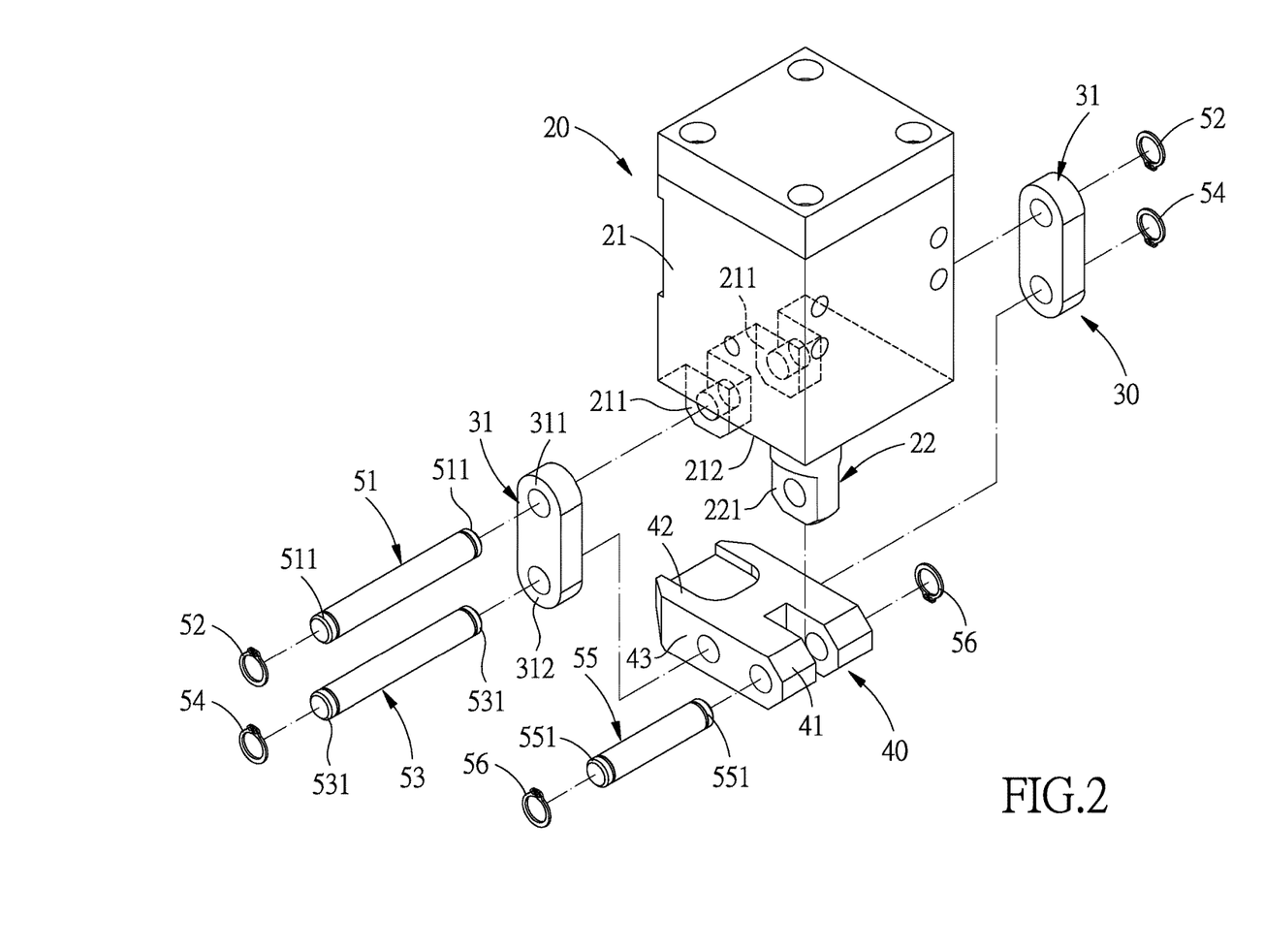
FIG. 2 is an exploded view of the preferred embodiment of the present invention.
Figure 3:
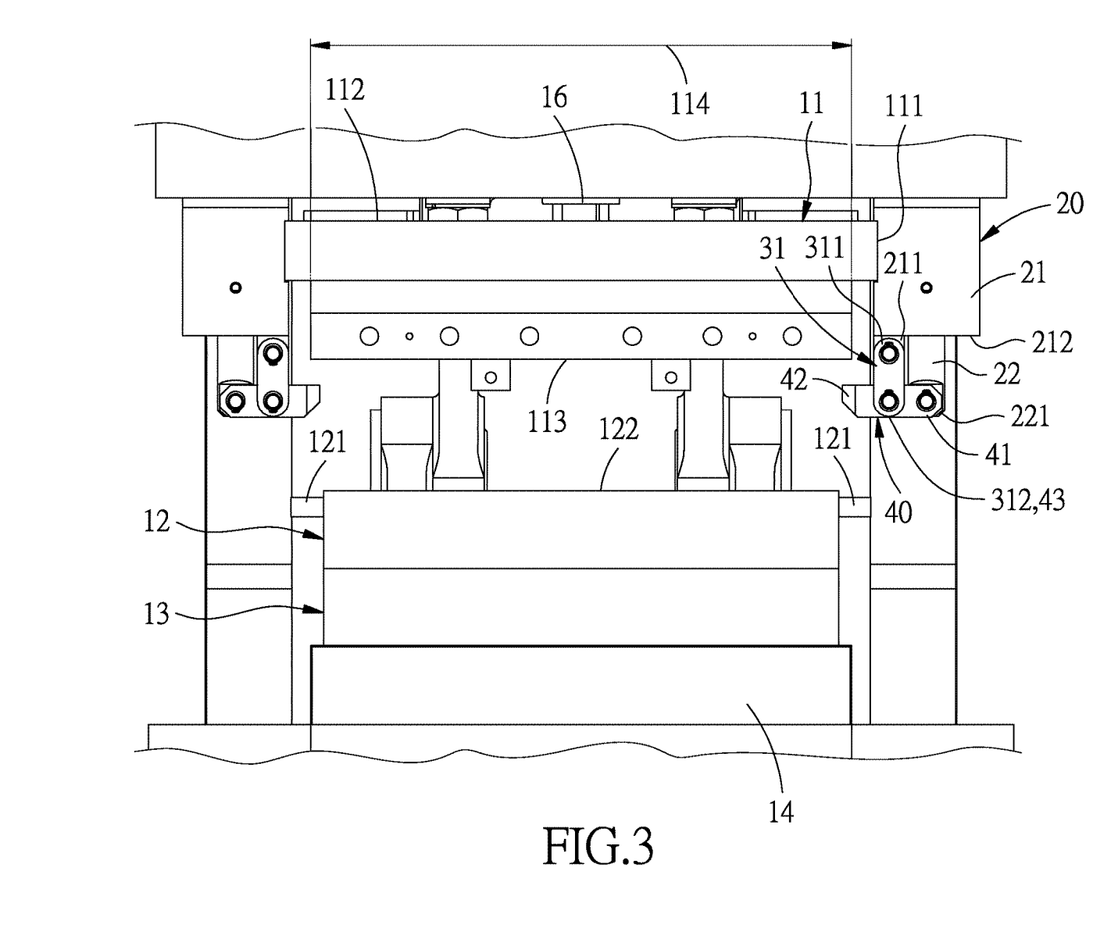
FIG. 3 is a front view of the preferred embodiment of the present invention.

Referring to FIGS. 1-3, a mold clamping device for an automatic mold opening and closing machine in accordance with the present invention is applied to a mold mounting unit 11 for the automatic mold opening and closing machine and used to clamp (secure) or release an upper mold 12 which has a pair of wings 121. In this embodiment, the automatic mold opening and closing machine further includes: a base 14 for mounting of a lower mold 13, and a pivot seat 15 pivotally disposed above the base 14. The mold mounting unit 11 is linearly movably connected to the pivot seat 15 by an extensible device and used to clamp or release the upper mold 12. The mold mounting unit 11 includes two opposite lateral surfaces 111, a top surface 112, and a bottom surface 113 opposite the top surface 112. The mold clamping device includes two pressure cylinder units 20, two pivot units 30 and two clamping members 40.

The two pressure cylinder units 20 are located at the two lateral surfaces 111 of the mold mounting unit 11 and each includes a cylinder 21 fixed to the lateral surfaces 111, two protrusions 211 formed on the cylinder 21, and a piston 22 inserted in the cylinder 21 and movable between a first position and a second position. Each of the pistons 22 includes a rod portion 221 exposed out of the cylinder 21. In this embodiment, the protrusions 211 are located at a bottom surface 212 of the respective cylinders 21, and each of the pistons 22 extends and retracts along the direction from the top surface 112 to the bottom surface 113 of the mold mounting unit 11.

The two pivot units 30 are pivoted to the two pressure cylinder units 20, respectively, and each include two swing members 31, and each of the swing members 31 is provided with a first pivot portion 311 pivoted to a corresponding one of the protrusions 211, and a second pivot portion 312. In this embodiment, the first pivot portion 311 of the respective pivot units 30 is pivoted to a corresponding one of the protrusions 211 of the pressure cylinder units 20 by a first pivot 51. Each of the first pivot 51 has a first shaft portion 511 inserted out of the first pivot portion 311 and secured by a first restricting member 51, so that each of the swing members 31 is able to rotate about the first pivots 51 to swing with respect to the protrusions 211 of the pressure cylinder units 20.

The two clamping members 40 are pivotally disposed between the pressure cylinder units 20 and the pivot units 30, and each include an outer portion 41 pivoted to the rod portion 221 of a corresponding one of the pistons 22, an inner portion 42 for clamping or releasing the wings 121 of the upper mold 12, and a middle portion 43 located between the inner and outer portions 42, 41 and pivoted to the second pivot portion 312 of a corresponding one of the swing members 31. In this embodiment, the outer portion 41 of the respective clamping members 40 is pivoted to the protrusions 211 of the respective pressure cylinder units 20 by a second pivot 53 which has a second shaft portion 531 inserted out of the outer portion 41 and secured by a second restricting member 54. The middle portion 43 of the respective clamping members 40 is pivoted to the second pivot portion 312 of the respective pivot units 30 by a third pivot 55 which has a third shaft portion 551 inserted out of the second pivot portion 312 and secured by a third restricting member 56, so that the clamping members 40 can be driven to rotate about the third pivots 55 during extension or retraction of the pistons 22.

For easy description, only one side of the mold clamping device (which involves one pressure cylinder unit 20, one pivot unit 30 and one clamping member 40) is described hereinbelow. The clamping member 40 will be driven to rotate an angle to disengage the inner portion 42 from the wing 121 of the upper mold 12, when the first piston 22 is in the first position. When in the second position, the piston 22 will drive the clamping member 40 to rotate an angle in a reverse direction, so as to make the wing 121 of the upper mold 12 clamped between the inner portion 42 and the bottom surface 113 of the mold mounting unit 11. In this embodiment, when the piston 22 is in the first position, the inner portion 42 of the clamping member 40 is not within the area 114 below the bottom surface 113 of the mold mounting unit 11. When the piston 22 is in the second position, the inner portion 42 of the clamping member 40 is within the area 114 below the bottom surface 113 of the mold mounting unit 11.

What mentioned above are the structural relations of the main components of the embodiment, and for a better understanding of the operation and function of the present invention, please refer to the following descriptions.

Figure 4:
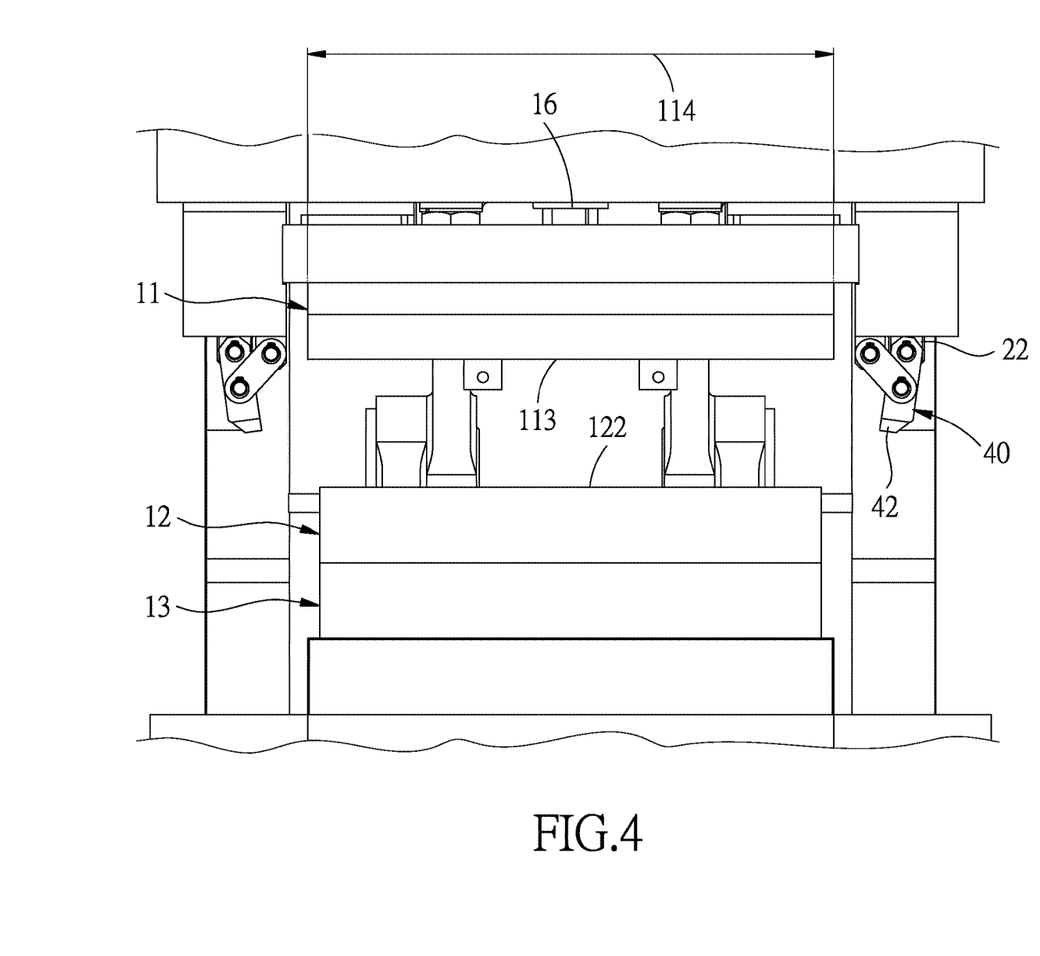
FIG. 4 is an operational view of the preferred embodiment of the present invention, showing that the piston is moved from the first position from the second position.

For the clamping of the upper mold 20:

As shown in FIGS. 3 and 4, the piston 22 is controlled to stay in the first position to make the inner portion 42 of the clamping member 40 stay out of the area 114 below the bottom surface 113 of the mold mounting unit 11, so as to prevent interference of the clamping member 40 with the upper mold 12 during the downward movement of the mold mounting unit 11.

Figure 6:
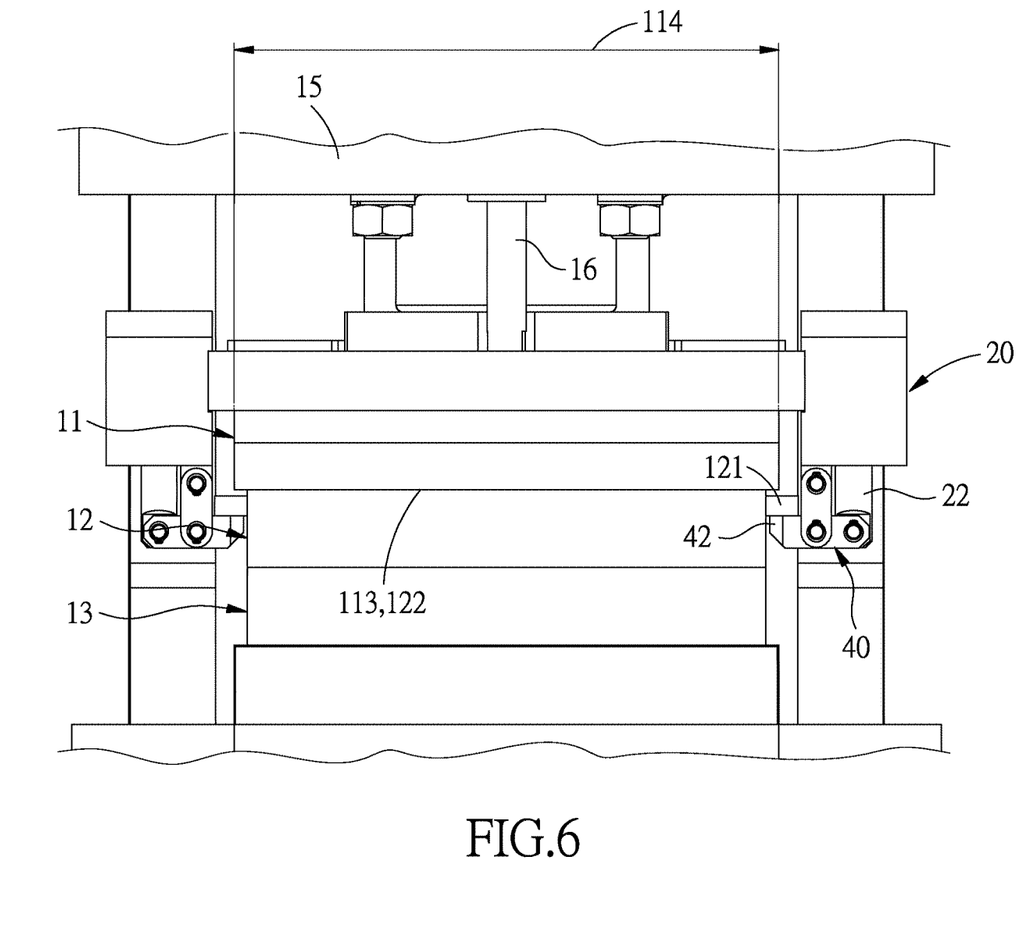
FIG. 6 is an operational view of the preferred embodiment of the present invention, showing that piston moves from the first position to the second position.

Referring then to FIGS. 4 and 6, the extensible unit 16 then pushes the mold mounting unit 11 a distance toward the upper mold 12 which is disposed on the lower mold 13, to make the bottom surface 113 of the mold mounting unit 11 abutted against the top surface 122 of the upper mold 12.

Figure 5:
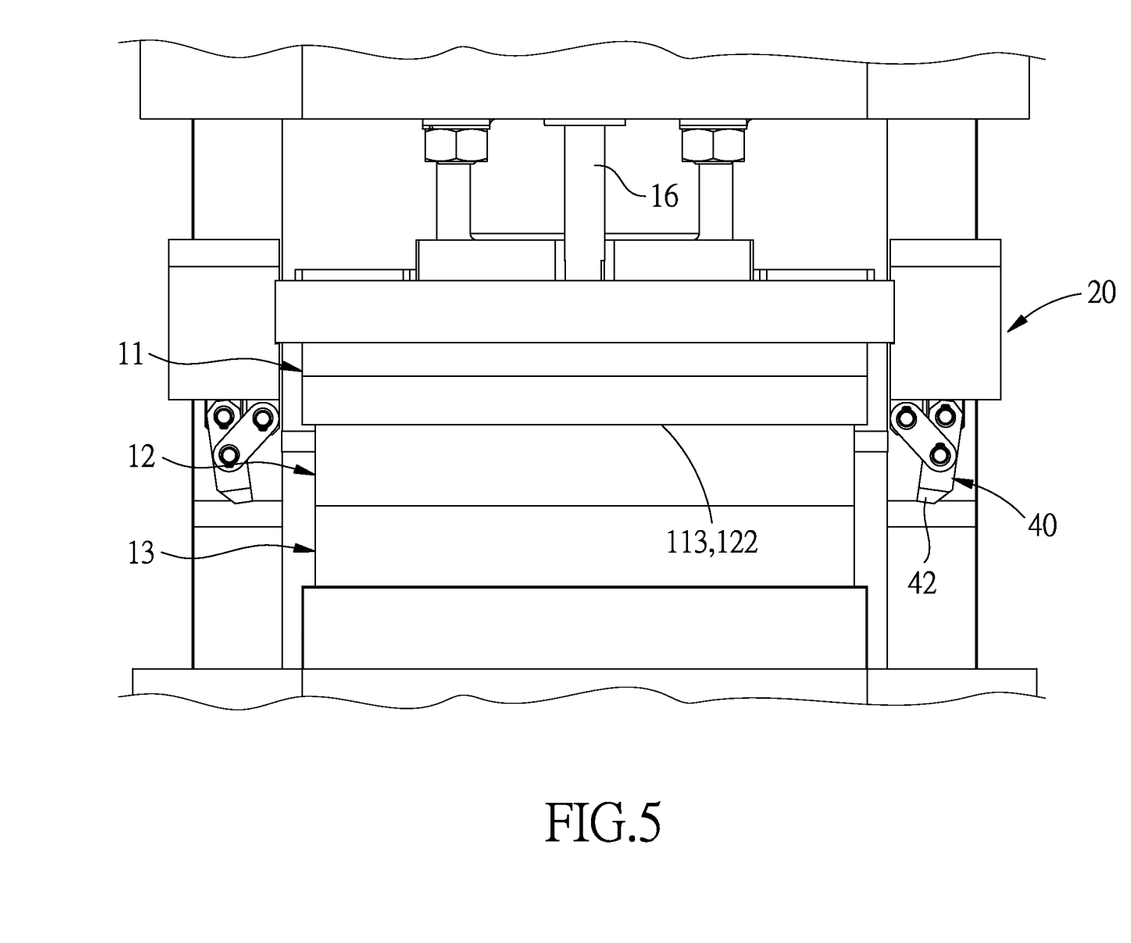
FIG. 5 is an operational view of the preferred embodiment of the present invention, showing that the piston is in the first position where the mold mounting unit is abutted against the upper mold.

Referring then to FIGS. 5 and 6, then the piston 22 of the pressure cylinder unit 20 is controlled to move downward from the first position to the second position. At this moment, the clamping member 40 pivots from a vertical position into a horizontal position, the inner portion 42 of the clamping member 40 is moved to the area 114 below the bottom surface 113 of the mold mounting unit 11 and finally into the position right beneath the wing 121 of the upper mold 12, so that the wing 121 of the upper mold 12 is clamped between the inner portion 42 and the bottom surface 113 of the mold mounting unit 11.

Figure 7:
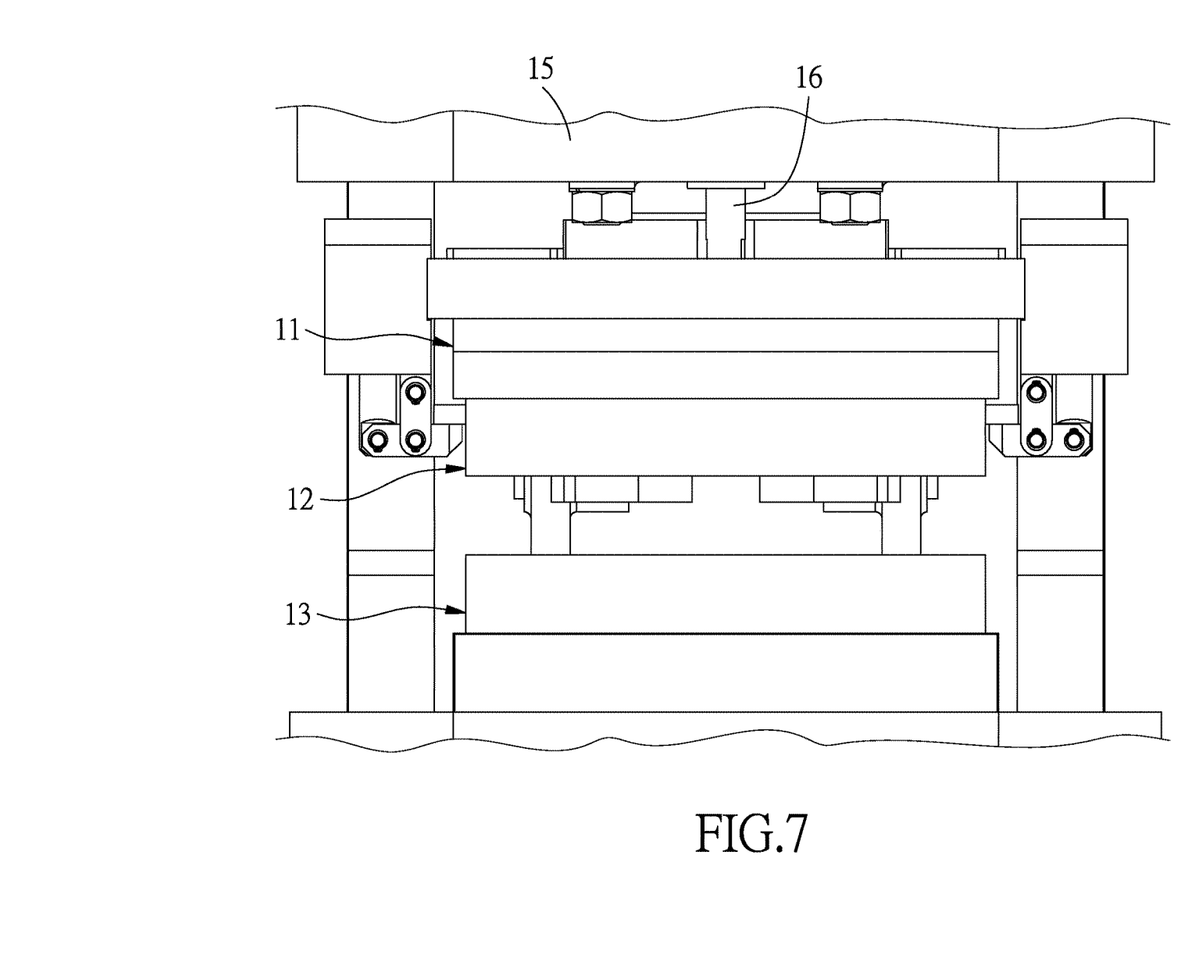
FIG. 7 is an operational view of the preferred embodiment of the present invention, showing that the upper mold moves up away from the lower mold.

Referring finally to FIGS. 6 and 7, finally, the extensible unit 16 is controlled to push the mold mounting unit 11 toward the pivot seat 15, so as to separate the upper mold 12 from the lower mold 13.

Releasing of the upper mold after clamping operation can be achieved by conducting the above steps in a reverse manner, namely, as shown in FIGS. 7 and 6, the extensible unit 16 pushes the mold mounting unit 11 downward, so that the upper mold 12 disposed on the mold mounting unit 11 is closed with respect to the lower mold 13. Then, as shown in FIGS. 6 and 5, the piston 22 of the pressure cylinder unit 20 is moved from the second position to the first position so as to release the inner portion 42 of the clamping member 40 from the wing 121 of the upper mold 12, and thus the releasing of the upper mold 12 after clamping operation is finished, as shown in FIG. 4.

While we have shown and described various embodiments in accordance with the present invention, it is clear to those skilled in the art that further embodiments may be made without departing from the scope of the present invention.

What is claimed is:

1. A mold clamping device for an automatic mold opening and closing machine being applied to a mold mounting unit and used to clamp or release an upper mold which has a pair of wings, the mold clamping device comprising:

two pressure cylinder units located at two lateral surfaces of the mold mounting unit and each including a cylinder fixed to the lateral surfaces, two protrusions formed on the cylinder, and a piston inserted in the cylinder and movable between a first position and a second position, wherein each of the pistons includes a rod portion exposed out of the cylinder;

two pivot units pivoted to the two pressure cylinder units, respectively, and each including two swing members, wherein each of the swing members is provided with a first pivot portion pivoted to a corresponding one of the protrusions, and a second pivot portion; and two clamping members pivotally disposed between the pressure cylinder units and the pivot units, and each including an outer portion pivoted to the rod portion of a corresponding one of the pistons, an inner portion for clamping or releasing the wings of the upper mold, and a middle portion located between the inner and outer portions and pivoted to the second pivot portion of a corresponding one of the swing members;

wherein the clamping members are driven to rotate an angle to disengage the inner portions with the wings of the upper mold when the pistons are moved to the first positions, and the clamping members are driven to rotate an angle in a reverse direction when the pistons are moved to the second positions, so that the wings of the upper mold are clamped by the inner portions and the bottom surface of the mold mounting unit respectively.

2. The mold clamping device as claimed in claim 1, wherein each of the pistons extends and retracts along a direction from the top surface to the bottom surface of the mold mounting unit.

3. The mold clamping device as claimed in claim 1, wherein the first pivot portion of the respective pivot units is pivoted to a corresponding one of the protrusions of the pressure cylinder units by a first pivot, and each of the first pivots has a first shaft portion inserted out of the first pivot portion and secured by a first restricting member.

4. The mold clamping device as claimed in claim 1, wherein the outer portion of the respective clamping members is pivoted to the protrusions of the respective pressure cylinder units by a second pivot which has a second shaft portion inserted out of the outer portion and secured by a second restricting member.

5. The mold clamping device as claimed in claim 1, wherein the middle portion of the respective clamping members is pivoted to the second pivot portion of the respective pivot units by a third pivot which has a third shaft portion inserted out of the second pivot portion and secured by a third restricting member.

6. The mold clamping device as claimed in claim 1, wherein when the piston is in the first position, the inner portion of each of the clamping members is not within an area below the bottom surface of the mold mounting unit, and when the piston is in the second position, the inner portion of each of the clamping members is within the area below the bottom surface of the mold mounting unit.

* * * * *